(12) United States Patent
Lu et al.

(10) Patent No.: US 12,334,092 B2
(45) Date of Patent: Jun. 17, 2025

(54) SPEECH SEPARATION METHOD, ELECTRONIC DEVICE, CHIP, AND COMPUTER- READABLE STORAGE MEDIUM

(71) Applicants: Huawei Technologies Co., Ltd., Shenzhen (CN); INSTITUTE OF AUTOMATION, CHINESE ACADEMY OF SCIENCES, Beijing (CN)

(72) Inventors: Henghui Lu, Beijing (CN); Lei Qin, Shenzhen (CN); Peng Zhang, Beijing (CN); Jiaming Xu, Beijing (CN); Bo Xu, Beijing (CN)

(73) Assignees: Huawei Technologies Co., Ltd., Shenzhen (CN); Institute of Automation, Chinese Academy of Sciences, Beijing (CN)

( * ) Notice: Subject to any disclaimer, the term of this patent is extended or adjusted under 35 U.S.C. 154(b) by 183 days.

(21) Appl. No.: 18/026,960

(22) PCT Filed: Aug. 24, 2021

(86) PCT No.: PCT/CN2021/114204
§ 371 (c)(1),
(2) Date: Mar. 17, 2023

(87) PCT Pub. No.: WO2022/062800
PCT Pub. Date: Mar. 31, 2022

(65) Prior Publication Data
US 2023/0335148 A1   Oct. 19, 2023

(30) Foreign Application Priority Data
Sep. 25, 2020   (CN) .......................... 202011027680.8

(51) Int. Cl.
*G10L 21/0208*   (2013.01)
*G06V 20/40*   (2022.01)
*G10L 21/055*   (2013.01)

(52) U.S. Cl.
CPC .......... *G10L 21/0208* (2013.01); *G06V 20/46* (2022.01); *G10L 21/055* (2013.01)

(58) Field of Classification Search
CPC ...... G06V 20/46; G10L 15/25; G10L 15/2025
See application file for complete search history.

(56) References Cited

U.S. PATENT DOCUMENTS 7,321,854 B2 *  1/2008  Sharma ................ G06V 40/20
                                             704/E15.041
7,920,761 B2 *  4/2011  Amir .................... G06V 20/40
                                             382/284
(Continued)

FOREIGN PATENT DOCUMENTS

CN        101952884 B      4/2012
CN        108320732 A      7/2018
(Continued)

OTHER PUBLICATIONS

Afouras et al., "The Conversation: Deep Audio-Visual Speech Enhancement," arXiv:1804.04121v1 [cs.CV], total 5 pages (Apr. 11, 2018).

(Continued)

*Primary Examiner* — Jesse S Pullias
(74) *Attorney, Agent, or Firm* — Leydig, Voit & Mayer, Ltd.

(57) ABSTRACT

A speech separation method is provided, and relates to the field of speech. The method includes: obtaining, in a speaking process of a user, audio information including a user speech and video information including a user face; coding the audio information to obtain a mixed acoustic feature; extracting a visual semantic feature of the user from the (Continued)

video information; inputting the mixed acoustic feature and the visual semantic feature into a preset visual speech separation network to obtain an acoustic feature of the user; and decoding the acoustic feature of the user to obtain a speech signal of the user. An electronic device, a chip, and a computer-readable storage medium are provided.

20 Claims, 6 Drawing Sheets

(56) References Cited

U.S. PATENT DOCUMENTS

| | | | |
|---|---|---|---|
| 8,121,432 B2* | 2/2012 | Dorai | G06F 16/7844 |
| | | | 382/276 |
| 9,110,922 B2* | 8/2015 | Bengio | G06F 16/53 |
| 10,681,313 B1* | 6/2020 | Day | G10L 17/00 |
| 11,354,906 B2* | 6/2022 | Perazzi | G06N 3/045 |
| 2016/0071024 A1* | 3/2016 | Amer | G06F 18/29 |
| | | | 706/12 |
| 2020/0065612 A1* | 2/2020 | Xu | G06V 40/174 |
| 2020/0335121 A1* | 10/2020 | Mosseri | G10L 15/25 |
| 2021/0134312 A1* | 5/2021 | Koishida | G06V 20/46 |

FOREIGN PATENT DOCUMENTS

| | | |
|---|---|---|
| CN | 110246512 A | 9/2019 |
| CN | 110992978 A | 4/2020 |
| CN | 111052232 A | 4/2020 |
| CN | 111247585 A | 6/2020 |
| EP | 3607547 A1 | 2/2020 |

OTHER PUBLICATIONS

Ideli et al., "Visually Assisted Time-Domain Speech Enhancement," 2019 IEEE Global Conference on Signal and Information Processing (GlobalSIP), total 5 pages, Institute of Electrical and Electronics Engineers, New York, New York (Nov. 11, 2019).

Lalonde et al., "Infants and Adults Use Visual Cues to Improve Detection and Discrimination of Speech in Noise," Journal of Speech, Language, and Hearing Research, vol. 62, No. 10, Total 16 pages (Oct. 25, 2019).

Ephrat et al., "Looking to listen at the cocktail party: A speaker-independent audio-visual model for speech separation," arXiv:1804.03619v2, ACM Trans. Graph., vol. 37, No. 4, Article 112, Total 11 pages (Aug. 9, 2018).

"Borui GE- There are so many voice car machines, but ours is different," https://www.sohu.com/a/288345742_816397, Total 12 pages (Jan. 11, 2019). With an English Abstract.

Iuzzolino et al., "AV(SE)2: Audio-Visual Squeeze-Excite Speech Enhancement," ICASSP 2020—2020 IEEE International Conference on Acoustics, Speech and Signal Processing (ICASSP), XP033794183, total 5 pages, Institute of Electrical and Electronics Engineers, New York, New York (May 4, 2020).

Zhang et al., "Audio-Visual Speech Separation with Visual Features Enhanced by Adversarial Training," 2021 International Joint Conference on Neural Networks (IJCNN), XP033975438, total 8 pages, Institute of Electrical and Electronics Engineers, New York, New York (Jul. 18, 2021).

Wu et al., "Time Domain Audio Visual Speech Separation," arXiv: 1904.03760v2 [eess.AS], XP081492539, total 7 pages (Sep. 22, 2019).

Gabbay et al., "Visual Speech Enhancement," arXiv: 1711.08789v3 [cs.CV], XP081506907, total 5 pages (Jun. 13, 2018).

Joze et al., "MMTM: Multimodal Transfer Module for CNN Fusion," arXiv: 1911.08670v2 [cs. Cv], XP081632285, total 11 pages (Mar. 30, 2020).

Zhang et al., "Audio-visual Speech Separation with Adversarially Disentangled Visual Representation," arXiv: 2011.14334v1 [cs. SD], XP081824378, total 5 pages (Nov. 29, 2020).

* cited by examiner

SPEECH SEPARATION METHOD, ELECTRONIC DEVICE, CHIP, AND COMPUTER- READABLE STORAGE MEDIUM

CROSS-REFERENCE TO RELATED APPLICATIONS

This application is a National Stage of International Application No. PCT/CN2021/114204, filed on Aug. 24, 2021, which claims priority to Chinese Patent Application No. 202011027680.8, filed on Sep. 25, 2020, both of which are hereby incorporated by reference in their entireties.

STATEMENT OF JOINT RESEARCH AGREEMENT

The subject matter and the claimed invention were made by or on the behalf of Institute of Automation, Chinese Academy of Sciences, of Haidian District, Beijing, P.R. China and Huawei Technologies Co., Ltd., of Shenzhen, Guangdong Province, P.R. China, under a joint research agreement titled "Audio and video convergence and voice separation technology." The joint research agreement was in effect on or before the claimed invention was made, and that the claimed invention was made as a result of activities undertaken within the scope of the joint research agreement.

TECHNICAL FIELD

This application relates to the field of terminal technologies, and in particular, to a speech separation method, an electronic device, a chip, and a computer-readable storage medium.

BACKGROUND

Speech interaction technologies have been increasingly applied to actual products, such as smart speech assistants of mobile phones, speech control of smart sound boxes, and video conference devices. However, in a case of interference from a noisy environment and a surrounding human voice, low speech recognition accuracy, call quality reduction and the like may occur. To resolve the foregoing problems, the industry proposes a speech separation technology based on audio and video convergence. The speech separation technology based on audio and video convergence performs speech separation based on a face representation. A basic idea of the speech separation technology is: extracting a face representation by using a pre-trained face model, and then extracting a speech of a specified speaker based on the face representation, a mixed speech, and a deep learning algorithm. However, the technology has a poor generalization capability for an unknown speaker. That is, when a speech of a target speaker does not appear in a training data set, precision of speech separation is poor, resulting in a poor user experience and a long delay of speech separation. Therefore, it is difficult to apply the technology to an application scenario of real-time speech separation.

SUMMARY

In view of this, it is necessary to provide a speech separation method, which can overcome the foregoing problem, has a strong generalization capability for an unknown speaker, has high speech separation accuracy, and improves user experience.

According to a first aspect, embodiments of this application disclose a speech separation method, including: obtaining, in a speaking process of a user, audio information including a user speech and video information including a user face; coding the audio information to obtain a mixed acoustic feature; extracting a visual semantic feature of the user from the video information, the visual semantic feature including a feature of a facial motion of the user in the speaking process; inputting the mixed acoustic feature and the visual semantic feature into a preset visual speech separation network to obtain an acoustic feature of the user; and decoding the acoustic feature of the user to obtain a speech signal of the user.

By using the technical solution, speech separation can be performed, based on a visual semantic feature, on a mixed speech including a user speech and an environmental noise, whereby the user speech can be accurately separated, thereby improving user experience.

In a possible implementation, the audio information is mixed speech information including the user speech and an environmental noise. The coding the audio information includes: constructing a time-domain audio coder based on a convolutional neural network; and performing time-domain coding on the audio information by using the time-domain audio coder.

By using the technical solution, time-domain coding is performed on a mixed speech, whereby a time-domain speech signal can be obtained by decoding subsequently, thereby reducing a loss of speech phase information, improving speech separation performance, and having an advantage of a low speech separation delay.

In a possible implementation, the decoding the acoustic feature of the user to obtain a speech signal of the user includes: constructing a time-domain audio decoder based on the convolutional neural network; and decoding the acoustic feature of the user by using the time-domain audio decoder to obtain a time-domain speech signal of the user.

By using the technical solution, a time-domain speech signal can be obtained by decoding subsequently, thereby reducing a loss of speech phase information, improving speech separation performance, and having an advantage of a low speech separation delay.

In a possible implementation, the audio information is mixed speech information including the user speech and an environmental noise. The coding the audio information includes: performing time-domain coding on the audio information by using a preset short-time Fourier transform algorithm.

By using the technical solution, time-domain coding is performed on a mixed speech, whereby a time-domain speech signal can be obtained by decoding subsequently, thereby reducing a loss of speech phase information, improving speech separation performance, and having an advantage of a low speech separation delay.

In a possible implementation, the decoding the acoustic feature of the user to obtain a speech signal of the user includes: decoding the acoustic feature of the user by using a preset inverse short-time Fourier transform algorithm to obtain a time-domain speech signal of the user.

By using the technical solution, a time-domain speech signal can be obtained by decoding subsequently, thereby reducing a loss of speech phase information, improving speech separation performance, and having an advantage of a low speech separation delay.

In a possible implementation, the extracting a visual semantic feature of the user from the video information includes: converting the video information into image frames arranged in a frame play sequence; processing each of the image frames to obtain a plurality of face thumbnails that have a preset size and include the user face; and inputting the plurality of face thumbnails into a preset decoupling network, to extract a visual semantic feature of the user.

By using the technical solution, speech separation is performed, based on a visual semantic feature, on a mixed speech including a user speech and an environmental noise, whereby the user speech can be accurately separated, thereby improving user experience.

In a possible implementation, the processing each image frame to obtain a plurality of face thumbnails that have a preset size and include the user face includes: locating an image area including the user face in each of the image frames; and zooming in or out the image area to obtain face thumbnails that have the preset size and include the user face.

By using the technical solution, speech separation is performed, based on a visual semantic feature, on a mixed speech including a user speech and an environmental noise, whereby the user speech can be accurately separated, thereby improving user experience.

In a possible implementation, the inputting the plurality of face thumbnails into a preset decoupling network, to extract a visual semantic feature of the user includes: inputting the plurality of face thumbnails into the preset decoupling network; and mapping, by using the preset decoupling network, each of the face thumbnails to a visual representation including a facial identity feature and the visual semantic feature, and separating the visual semantic feature from the visual representation.

By using the technical solution, a visual semantic feature is separated from a visual representation by using a preset decoupling network, and speech separation is performed on a mixed speech including a user speech and an environmental noise, whereby the user speech can be accurately separated, thereby improving user experience.

In a possible implementation, the inputting the mixed acoustic feature and the visual semantic feature into a preset visual speech separation network to obtain an acoustic feature of the user includes: obtaining a time dependency relationship of the mixed acoustic feature, to obtain a deep mixed acoustic feature based on the time dependency relationship of the mixed acoustic feature; obtaining a time dependency relationship of the visual semantic feature, to obtain a deep visual semantic feature based on the time dependency relationship of the visual semantic feature; performing modal fusion on the deep mixed acoustic feature and the deep visual semantic feature to obtain a visual and auditory feature; and obtaining an acoustic feature of the user through prediction based on the visual and auditory feature.

By using the technical solution, speech separation is performed, by using a preset visual speech separation network, on a mixed speech including a user speech and an environmental noise, whereby the user speech can be accurately separated, thereby improving user experience.

In a possible implementation, before the performing modal fusion on the deep mixed acoustic feature and the deep visual semantic feature, the method further includes: performing time dimension synchronization processing on the deep mixed acoustic feature and the deep visual semantics, to keep time dimensions of the deep mixed acoustic feature and the deep visual semantics synchronized.

By using the technical solution, speech separation is performed, by using a preset visual speech separation network, on a mixed speech including a user speech and an environmental noise, whereby the user speech can be accurately separated, thereby improving user experience.

In a possible implementation, the obtaining an acoustic feature of the user through prediction based on the visual and auditory feature includes: obtaining a mask value of the user speech through prediction based on the visual and auditory feature; performing output mapping processing on the mask value by using a preset activation function; and performing a matrix dot product calculation on the mask value processed by the preset activation function and the mixed acoustic feature, to obtain the acoustic feature of the user.

By using the technical solution, speech separation is performed, by using a preset visual speech separation network, on a mixed speech including a user speech and an environmental noise, whereby the user speech can be accurately separated, thereby improving user experience.

In a possible implementation, the performing output mapping processing on the mask value by using a preset activation function includes: performing output mapping processing on the mask value by using a sigmoid function if the audio information is coded based on a convolutional neural network; or performing output mapping processing on the mask value by using a Tanh function if the audio information is coded based on a short-time Fourier transform algorithm.

By using the technical solution, output mapping processing is performed according to different audio coding algorithms by using activation functions corresponding to the audio coding algorithms.

According to a second aspect, embodiments of this application provide a computer-readable storage medium, including a computer instruction. When the computer instruction is run on an electronic device, the electronic device is enabled to perform the speech separation method described in the first aspect.

According to a third aspect, embodiments of this application provide an electronic device. The electronic device includes a processor and a memory. The memory is configured to store an instruction. The processor is configured to invoke the instruction in the memory, whereby the electronic device performs the speech separation method described in the first aspect.

According to a fourth aspect, embodiments of this application provide a computer program product. When the computer program product is run on a computer, the computer is enabled to perform the speech separation method described in the first aspect.

According to a fifth aspect, embodiments of this application provide an apparatus. The apparatus has a function of implementing behavior of a first electronic device in the method provided in the first aspect. The function may be implemented by hardware, or may be implemented by executing corresponding software by hardware. The hardware or software includes one or more modules corresponding to the foregoing functions.

It may be understood that the computer-readable storage medium provided in the second aspect, the electronic device provided in the third aspect, the computer program product provided in the fourth aspect, and the apparatus provided in the fifth aspect all correspond to the method in the first aspect. Therefore, for beneficial effects that can be achieved by the computer-readable storage medium, the electronic device, the computer program product, and the apparatus, refer to the beneficial effects in the corresponding method provided above. Details are not described herein again.

DETAILED DESCRIPTION OF ILLUSTRATIVE EMBODIMENTS

It should be noted that "at least one" means one or a plurality of and "a plurality of" means two or more in this application. "And/or" describes an association relationship between associated objects, and represents that three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and the like (if existent) are intended to distinguish between similar objects but do not necessarily indicate a specific order or sequence.

Figure 1:
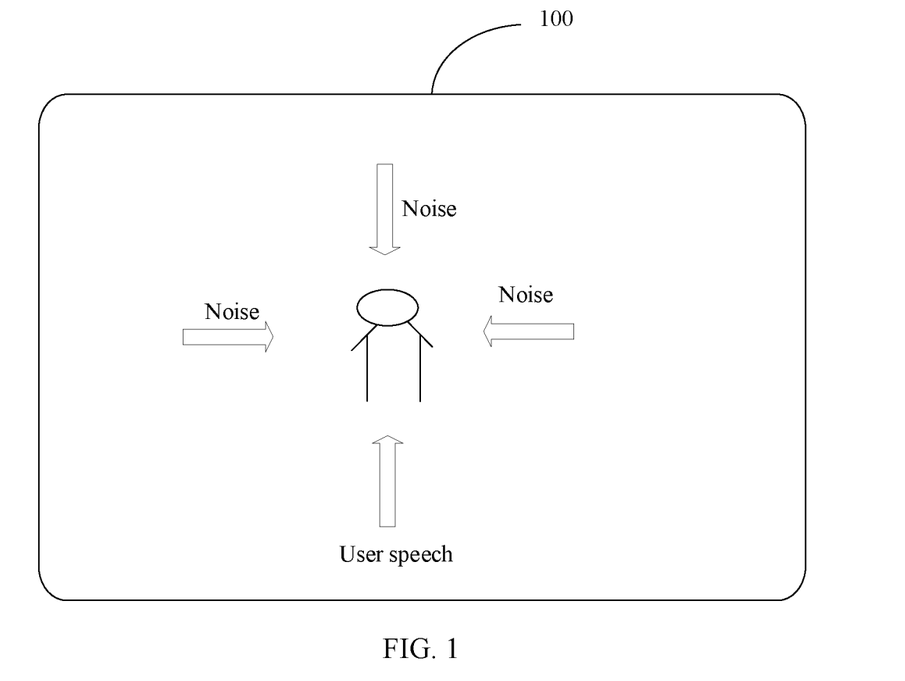
FIG. 1 is a schematic diagram of an application scenario of a speech separation apparatus according to an embodiment of this application.

For ease of understanding, descriptions of some concepts related to embodiments of this application are provided as examples for reference, as shown in the following:

With reference to FIG. 1, the following describes an example of a schematic diagram of an application scenario of a speech separation apparatus according to embodiments of the present invention. The speech separation apparatus may be disposed in an electronic device 100.

When a user uses the electronic device 100 to make a call, a video conference, speech interaction control, or the like, if a current scenario in which the user is located includes sound of another person or sound of another object, a user speech may be separated and enhanced, so as to highlight the user speech and reduce interference of a surrounding noise to the user speech.

The electronic device 100 may be a device such as a mobile phone, a computer, a smart appliance, or an in-vehicle infotainment.

Figure 2:
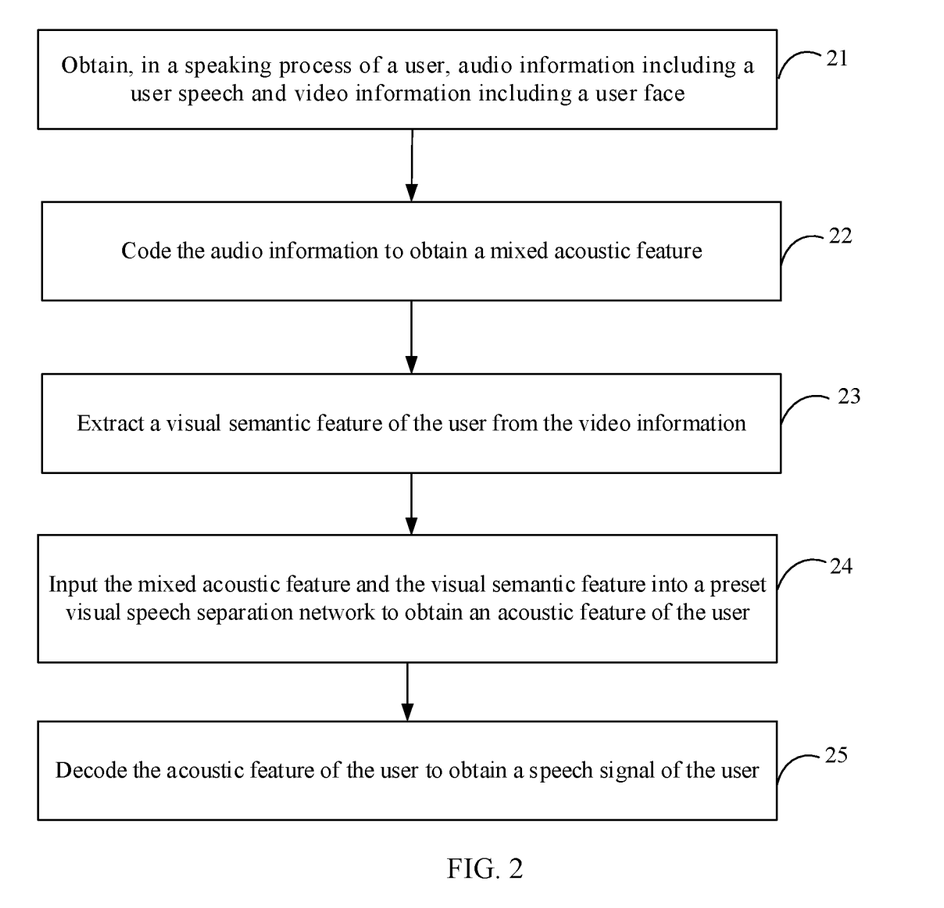
FIG. 2 is a schematic flowchart of a speech separation method according to an embodiment of this application.

FIG. 2 shows a speech separation method according to embodiments of this application. The method is applied to the electronic device 100. In embodiments, the speech separation method includes the following steps.

21. Obtain, in a speaking process of a user, audio information including a user speech and video information including a user face.

In some embodiments, the electronic device 100 may include a photographing function and a sound pickup function. For example, the electronic device 100 includes a camera and a microphone. The camera is used to collect video information including a user face in a speaking process of a user, and the microphone is used to collect audio information including a user speech in the speaking process of the user, whereby the audio information including the user speech and the video information including the user face in the speaking process of the user can be obtained from the camera and the microphone.

It may be understood that the video information collected by the camera not only includes face information of the user, but also may include information of another body part of the user, current photographing background information, or body part information of another user. The audio information collected by the microphone not only includes a speech currently made by the user, but also may include an environmental noise. For example, the environmental noise is a sound made by another user or another object.

22. Code the audio information to obtain a mixed acoustic feature.

In some embodiments, the audio information may be coded by using a preset audio coder to obtain a mixed acoustic feature. The preset audio coder may be a coder constructed based on a convolutional neural network (Convolutional Neural Network, CNN), but is not limited to a CNN. Alternatively, the preset audio coder may be another type of neural network, such as a long short-term memory network (Long Short-Term Memory, LSTM) or a recurrent neural network (Recurrent Neural Network, RNN). A construction manner of constructing the preset audio coder by using the CNN may be a construction manner recorded in an existing solution, and details are not described herein.

In some embodiments, audio information processing generally includes time-domain processing and frequency-domain processing. Compared with the frequency-domain processing, the time-domain processing reduces the length of a speech frame. This facilitates design of a low-delay speech separation model and reduces speech phase information losses, and therefore improves speech separation performance. The preset audio coder is preferably an audio coder that is constructed based on the CNN and used for the time-domain coding.

In some embodiments, the audio information is a mixed speech including a user speech, and the mixed acoustic feature may be a vector that includes a mixed speech feature and is obtained through CNN coding.

In some embodiments, time-domain coding may be performed on the audio information by using a short-time Fourier transform algorithm, to obtain a mixed acoustic feature.

23. Extract a visual semantic feature of the user from the video information.

In some embodiments, the visual semantic feature includes a feature of a facial motion of the user, for example, a feature of a lip motion or a cheek motion in the speaking process. A visual semantic feature of the user may be extracted from the video information in the following manner.

a. Convert the video information into image frames arranged in a frame play sequence, and process the image frames to obtain face thumbnails that have a preset size and include the user face.

Specifically, the video information may be decoded by using an existing video decoding technology to obtain a plurality of image frames arranged in a frame play sequence. Then an image area including the user face in each image frame is located by using an existing face detection technology. Finally, the image area is zoomed in or out to obtain a face thumbnail that has the preset size and includes the user face. The preset size may be set according to an actual requirement. For example, the preset size is 256*256. That is, the image area of the user face is converted into a 256*256 face thumbnail.

In some embodiments, because sizes of image areas including the user face in the image frames may be different, to convert all the image areas into 256*256 face thumbnails, some of the image areas may need to be zoomed in while the others need to be zoomed out. Specifically, whether to zoom in or zoom out may be determined based on the size of the located image area of the user face.

b. Input the plurality of face thumbnails into a preset decoupling network, to extract a visual semantic feature of the user.

Figure 3:
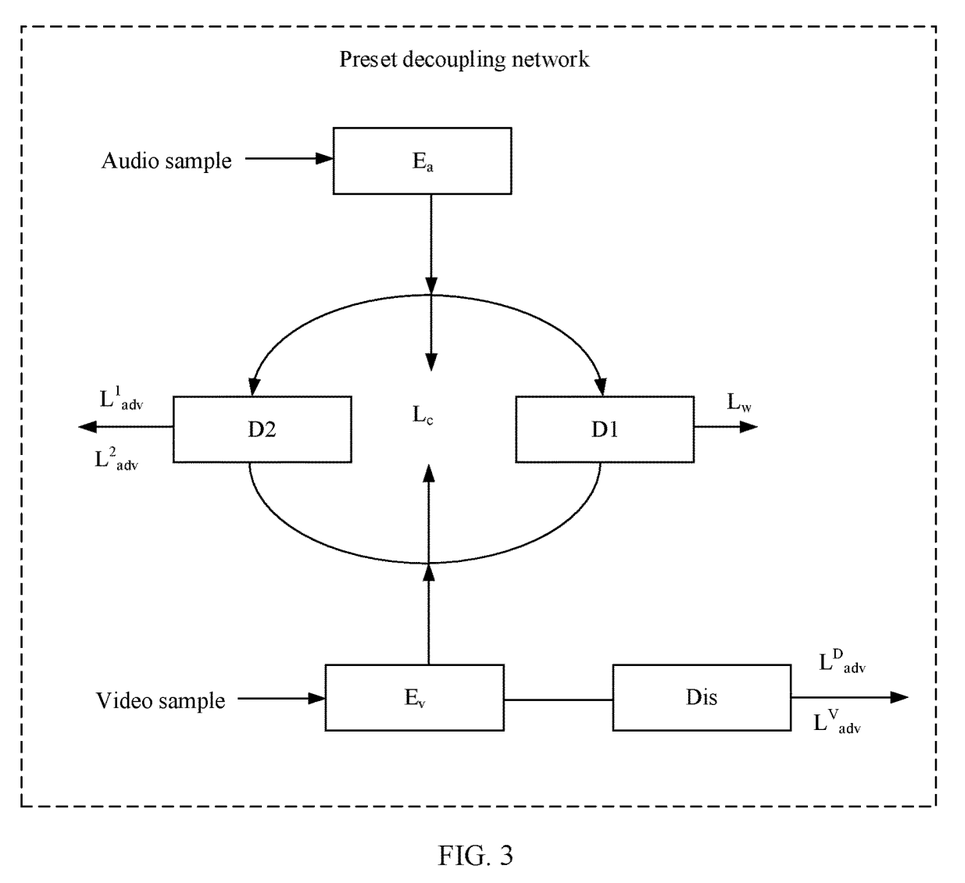
FIG. 3 is a schematic diagram of a network structure of a preset decoupling network according to an embodiment of this application.

Specifically, when the face thumbnails of the preset size are obtained, the face thumbnails may be input into a preset decoupling network on which adversarial training is performed, and a visual semantic feature of the user is extracted by using the preset decoupling network. FIG. 3 shows a schematic diagram of a network structure of the preset decoupling network. The preset decoupling network may include a visual coder $E_v$, a speech coder $E_a$, a classifier $D_1$, a binary classification discriminator $D_2$, and an identity discriminator Dis.

In some embodiments, the preset decoupling network may be trained by using N video samples and N audio samples. N is a positive integer greater than 1.

i. Learn a joint audio-visual representation, and map the face thumbnails to a visual representation including a facial identity feature and a visual semantic feature.

During training, an $m^{th}$ audio sample is randomly selected from audio samples having a size of N, and an $n^{th}$ video sample is randomly selected from video samples having a size of N. A label is defined as follows: When the $n^{th}$ video sample matches the $m^{th}$ audio sample (that is, the audio sample is a playing sound of the video sample), the label is denoted as $I_{mn}=1$. When the $n^{th}$ video sample does not match the $m^{th}$ audio sample, the label is denoted as $I_{mn}=0$. The $n^{th}$ video sample may be input to the visual coder $E_v$ (obtained by constructing based on the CNN) to obtain a visual representation $f_v(n)$ including a facial identity feature and a visual semantic feature. The $m^{th}$ audio sample may be input to the speech coder $E_a$ (obtained by constructing based on the CNN) to obtain a speech representation $f_a(m)$ including a sound feature.

After the visual representation $f_v(n)$ and the speech representation $f_a(m)$ are obtained, a distance between the visual representation $f_v(n)$ and the speech representation $f_a(m)$ may be shortened by using the following three processing manners.

(a) The visual representation $f_v(n)$ and the speech representation $f_a(m)$ share the same classifier $D_1$ to perform a word-level audio-visual speech recognition task, and a loss is recorded as $L_w$.

$$L_w = \sum_{k=1}^{N_w} p_k(\log(\widehat{p_k^v}) + \log(\widehat{p_k^a}))$$

Herein, $p_k^v \widehat{p_k^v}=\text{softmax}(C(f_{v(n)}))_k$, $p_k^a \widehat{p_k^a}=\text{softmax}(C(f_{a(m)}))_k$, $N_w$ is a total number of words in a training set, $p_k$ is a real category label, each category label may correspond to one word, and k is a positive integer greater than zero.

(b) Perform adversarial training by using the binary classification discriminator $D_2$ to recognize whether the input characterization is a visual characterization or an audio characterization.

First, weights of the visual coder $E_v$ and the speech coder $E_a$ are frozen (that is, the weights of the visual coder $E_v$ and the speech coder $E_a$ are fixed whereby the weights are not trained), the binary classification discriminator $D_2$ is trained to correctly distinguish whether the input characterization is a visual characterization or an audio characterization, and a training loss thereof is denoted as $L_{adv}^1$. Then, a weight of the binary classification discriminator $D_2$ is frozen, and the visual coder $E_v$ and the speech coder $E_a$ are trained, whereby the binary classification discriminator $D_2$ cannot correctly distinguish whether the input representation is a visual representation or an audio representation, and a training loss thereof is denoted as $L_{adv}^2$. The loss $L_{adv}^1$ and the loss $L_{adv}^2$ are shown as follows:

$$L_{adv}^1 = \|p_v - \text{sigmoid}(D_2(f_{v(n)}))\|_2^2 + \|p_a - \text{sigmoid}(D_2(f_{a(m)}))\|_2^2$$

$$L_{adv}^2 = \|p_v - \text{sigmoid}(D_2(f_{v(n)}))\|_2^2 + \|p_a - \text{sigmoid}(D_2(f_{a(m)}))\|_2^2$$

Herein, $p_v=0$ indicates that the input representation is a visual representation, and $p_a=1$ indicates that the input representation is an audio representation.

(c) The distance between the visual representation $f_v(n)$ and the speech representation $f_{a(m)}$ is minimized by comparing a loss $L_c$, and the loss $L_c$ is defined as follows:

$$L_c = \sum_{m,n=1}^{N,N} (1_{mn} d_{mn} + (1 - (1_{mn})) \max(1 - d_{mn}, 0))$$

Herein, $d_{mn}$ is a Euclidean distance between the visual representation $f_{v(n)}$ and the speech representation $f_{a(m)}$, $d_{mn} = \|f_{v(n)} - f_{a(m)}\|_2$.

ii. Separate a visual semantic feature from the visual representation in an adversarial manner.

First, the weight of the visual coder $E_v$ is frozen to train the identity discriminator Dis, whereby the identity discriminator Dis may correctly recognize the identity of each face in the video sample, and a training loss thereof is denoted as $L_{adv}^D$. Then, a weight of the identity discriminator Dis is frozen, and the visual coder $E_v$ is trained, whereby the visual representation obtained by the visual coder $E_v$ through coding completely loses identity information (that is, loses a face identity feature), and a training loss thereof is denoted as $L_{adv}^V$. After the training of the visual coder $E_v$ is completed, if the visual representation $f_v(n)$ is input to the visual coder $E_v$, an equal probability is preferred to be output for each type of identity. That is, identity information is completely lost, and the visual semantic feature may be separated from the visual representation by using the trained visual coder $E_v$. Each type of identity corresponds to an identity ID, and represents a person. The loss $L_{adv}^D$ and the loss $L_{adv}^V$ are as follows:

$$L_{adv}^D = \sum_{i=1}^{N_p} p^j \log(\text{softmax}(Dis(f_{v(n)})))$$

$$L_{adv}^V = \|\text{softmax}(Dis(f_{v(n)}))_j - 1/N_p\|_2^2$$

Herein, $N_p$ is an identity type, $p^j$ is a one-hot label, and p and j are positive integers greater than zero. For example, the N video samples include a total of 10 types of identities (the first type of identity to the tenth type of identity). If the first video sample belongs to the first type of identity, the corresponding one-hot may be represented as "1000000000". If the second video sample belongs to the third type of identity, the corresponding one-hot may be represented as "0010000000".

24. Input the mixed acoustic feature and the visual semantic feature into a preset visual speech separation network to obtain an acoustic feature of the user.

In some embodiments, the preset visual speech separation network may be a network constructed based on a temporal convolutional network (Temporal Convolutional Network, TCN). A schematic diagram of a network structure of the preset visual speech separation network may be shown in FIG. 4. The preset visual speech separation network includes a first TCN unit TCN-1, a second TCN unit TCN-2, a third TCN unit TCN-3, an upsampling unit Upsample, a modal fusion unit Modal_fusion, a regular-convolution unit LN_convld, an activation-convolution unit PreLU_convld, an activation unit σ/Tanh, and a matrix dot product calculation unit Matrix_dm.

Figure 4:
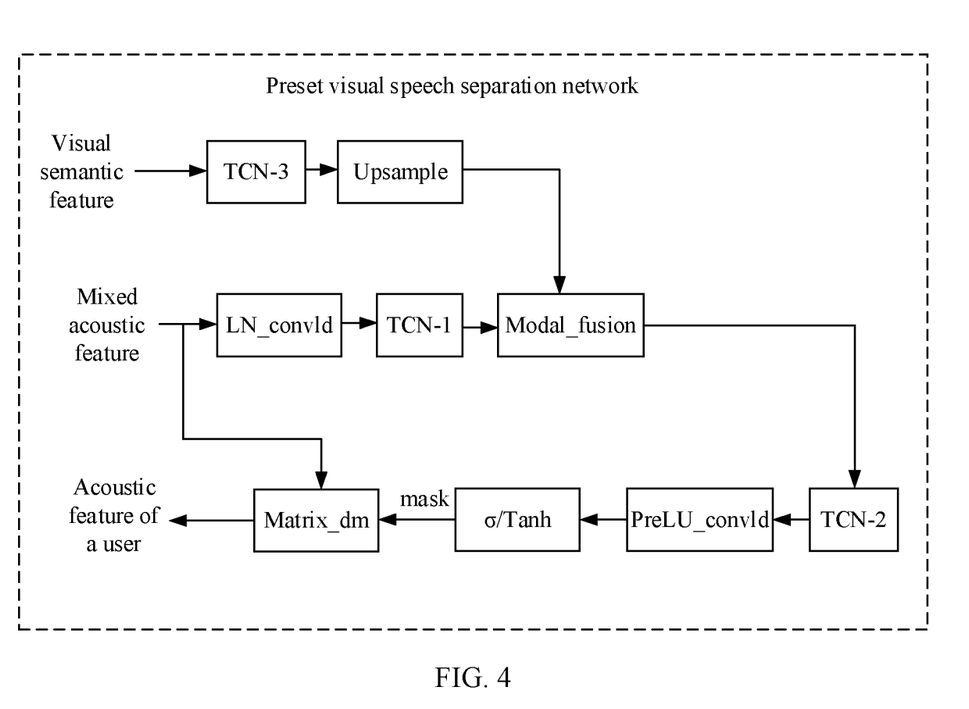
FIG. 4 is a schematic diagram of a network structure of a preset visual speech separation network according to an embodiment of this application.

The regular-convolution unit LN_convld is configured to perform regularization and one-dimensional convolutional layer processing on an input mixed acoustic feature. The first TCN unit TCN-1 is configured to capture a time dependency relationship of the mixed acoustic feature to obtain a deep mixed acoustic feature. The third TCN unit TCN-3 is configured to capture a time dependency relationship of an input visual semantic feature to obtain a deep visual semantic feature. The upsampling unit Upsample is configured to upsample the deep visual semantic feature, so as to keep the deep visual semantic feature and the deep mixed acoustic feature synchronized in a time dimension. The modal fusion unit Modal_fusion is configured to connect the deep visual semantic feature and the deep mixed acoustic feature in a channel dimension, and perform dimension transformation via a linear layer to obtain a fused visual and auditory feature. The fused visual and auditory feature may be represented by using the following formula: $f=P([a; \text{Upsample}(V)])$, where f is the fused visual and auditory feature, that is, an input of the second TCN unit TCN-2, P is linear mapping, a is the deep mixed acoustic feature, and V is the deep visual semantic feature. The second TCN unit TCN-2 and the activation-convolution unit PreLU_convld are configured to predict a mask value (mask) of the user speech according to the fused visual and auditory feature. The activation unit σ/Tanh is configured to introduce a nonlinear characteristic to perform mapping and output processing on the mask value. The matrix dot product calculation unit Matrix_dm is configured to perform a matrix dot product calculation on the mask output by the activation unit σ/Tanh and the mixed acoustic feature to obtain an acoustic feature of the user.

In some embodiments, when the mixed acoustic feature is obtained through CNN coding, the activation unit σ/Tanh may optionally use a sigmoid function to introduce a non-linear characteristic. When the mixed acoustic feature is obtained through short-time Fourier transform, the activation unit σ/Tanh may optionally use a Tanh function to introduce a non-linear characteristic.

25. Decode the acoustic feature of the user to obtain a speech signal of the user.

In some embodiments, when the acoustic feature of the user is obtained by using the preset visual speech separation network, the acoustic feature of the user may be decoded by using a preset audio decoder to obtain a speech signal of the user. The preset audio decoder may be a decoder constructed based on a CNN, but is not limited to the CNN. Alternatively, the preset audio decoder may be a neural network of another type, for example, an LSTM or an RNN. A construction manner of constructing the preset audio decoder by using the CNN may be a construction manner recorded in an existing solution, and details are not described herein.

It may be understood that, when the audio information is coded by using a short-time Fourier transform algorithm to obtain the mixed acoustic feature, the acoustic feature of the user may be decoded by using an inverse short-time Fourier transform algorithm to obtain the speech signal of the user.

In some embodiments, because time-domain coding is performed on the audio information by using the CNN or the short-time Fourier transform algorithm, the user speech signal obtained by decoding is a time-domain speech signal.

In the foregoing speech separation method, speech separation is performed on a mixed speech in a time domain based on a visual semantic feature, whereby a speech of a target speaker can be accurately separated from environmental noise interference in real time. For an unknown speaker, speech separation accuracy is high, generalization is strong, speech separation delay is low, and an application scenario of real-time speech separation is supported.

Figure 5:
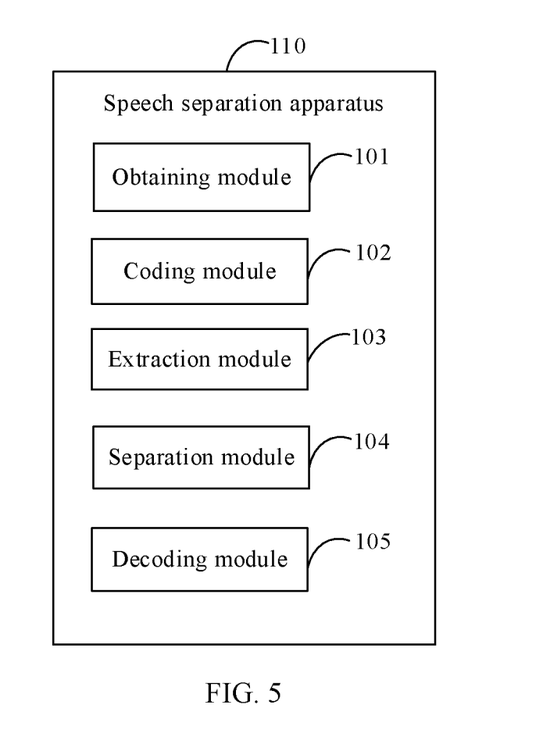
FIG. 5 is a schematic diagram of functional modules of a speech separation apparatus according to an embodiment of this application.

FIG. 5 shows a speech separation apparatus 110 provided in embodiments of this application. The speech separation apparatus 110 may be applied to the electronic device 100 shown in FIG. 1. The electronic device 100 may include a camera function and a sound pickup function. In embodiments, the speech separation apparatus 110 may include an obtaining module 101, a coding module 102, an extraction module 103, a separation module 104, and a decoding module 105.

The obtaining module 101 is configured to obtain, in a speaking process of a user, audio information including a user speech and video information including a user face.

The coding module 102 is configured to code the audio information to obtain a mixed acoustic feature.

The extraction module 103 is configured to extract a visual semantic feature of the user from the video information. The visual semantic feature includes a feature of a facial motion of the user in the speaking process.

The separation module 104 is configured to input the mixed acoustic feature and the visual semantic feature into a preset visual speech separation network to obtain an acoustic feature of the user.

The decoding module 105 is configured to decode the acoustic feature of the user to obtain a speech signal of the user.

It may be understood that division of the modules in the apparatus 110 is merely logical function division. In an actual implementation, all or some of the modules may be integrated into one physical entity, or may be physically separated. For example, the modules may be independently disposed processing elements, or may be integrated into a chip in the terminal for implementation. In addition, the modules may be stored in a storage element in the controller in a form of program code, and a processing element in the processor invokes and performs functions of the modules. In addition, the modules may be integrated together or may be independently implemented. The processing element may be an integrated circuit chip and has a signal processing capability. The processing element may be a general purpose processor, for example, a central processing unit (central processing unit, CPU), or may be one or more integrated circuits configured to implement the foregoing function modules, for example, one or more application-specific integrated circuits (application-specific integrated circuit, ASIC), one or more microprocessors (digital signal processor, DSP), or one or more field-programmable gate arrays (field-programmable gate array, FPGA).

Figure 6:
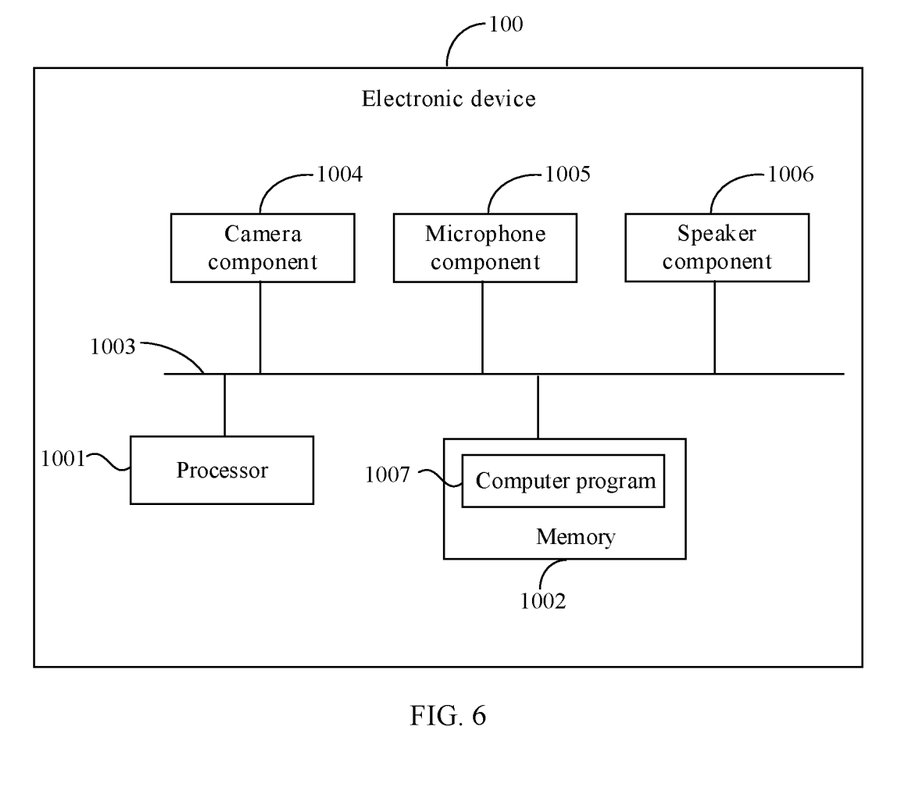
FIG. 6 is a possible schematic structural diagram of an electronic device according to an embodiment of this application.

FIG. 6 is a schematic diagram of a hardware structure of an electronic device 100 according to an embodiment of this application. As shown in FIG. 6, the electronic device 100 may include a processor 1001, a memory 1002, a communication bus 1003, a camera component 1004, a microphone component 1005, and a speaker component 1006. The memory 1002 is configured to store one or more computer programs 1007. The one or more computer programs 1007 are configured to be executed by the processor 1001. The one or more computer programs 1007 include an instruction. The instruction may be used to perform the speech separation method or the speech separation apparatus 110 in the electronic device 100.

It may be understood that the structure shown in embodiments does not constitute a specific limitation on the electronic device 100. In some other embodiments, the electronic device 100 may include more or fewer components than those shown in the figure, or some components may be combined, or some components may be split, or different component arrangements may be used.

The processor 1001 may include one or more processing units. For example, the processor 1001 may include an application processor (application processor, AP), a graphics processing unit (graphics processing unit, GPU), an image signal processor (image signal processor, ISP), a controller, a video codec, a DSP, a CPU, a baseband processor, and/or a neural-network processing unit (neural-network processing unit, NPU), and the like. Different processing units may be independent devices, or may be integrated into one or more processors.

A memory may be further disposed in the processor 1001, and is configured to store an instruction and data. In some embodiments, the memory in the processor 1001 is a cache memory. The memory may store an instruction or data that has been used or cyclically used by the processor 1001. If the processor 1001 needs to use the instruction or the data again, the instruction or the data may be directly invoked from the memory. Repeated access is avoided, waiting time of the processor 1001 is shortened, and therefore system efficiency is improved.

In some embodiments, the processor 1001 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

In some embodiments, the memory 1002 may include a high-speed random access memory, and may further include a non-volatile memory, for example, a hard disk, a memory, a plug-in hard disk, a smart memory card (Smart Media Card, SMC), a secure digital (Secure Digital, SD) card, a flash card (Flash Card), at least one magnetic disk storage device, a flash device, or another volatile solid-state storage device.

The camera component 1004 is configured to photograph face information of a speaker to generate video information including the face of the speaker. The camera component 1004 may include a lens, an image sensor, an image signal processor, and the like. The microphone component 1005 is configured to record a sound of the speaker and a surrounding environment sound to obtain audio information including a user speech. The microphone component 1005 may include a microphone and a peripheral circuit or element that cooperates with the microphone. The speaker component 1006 is configured to play the speech of the speaker obtained through speech separation processing, and the speaker component 1006 may include a speaker and a peripheral circuit or element cooperating with the speaker.

Embodiments further provide a computer storage medium. The computer storage medium stores a computer instruction. When the computer instruction is run on an electronic device, the electronic device is enabled to perform the related method steps, to implement the speech separation method in the foregoing embodiments.

Embodiments further provide a computer program product. When the computer program product is run on a computer, the computer is enabled to perform the related steps, to implement the speech separation method in the foregoing embodiments.

In addition, embodiments of this application further provide an apparatus. The apparatus may be specifically a chip, a component, or a module. The apparatus may include a processor and a memory that are connected. The memory is configured to store computer execution instructions. When the apparatus is run, the processor may execute the computer execution instructions stored in the memory, to enable the chip to perform the speech separation method in the foregoing method embodiments.

The first electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions may be allocated to different modules and implemented according to a requirement, that is, an inner structure of an apparatus is divided into different functional modules to implement all or some of the functions described above.

In several embodiments provided in this application, it should be understood that the disclosed apparatus and method may be implemented in other manners. For example, the apparatus embodiments described above are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that may store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A method, comprising:
    obtaining, by an electronic device, audio information and video information, the audio information including a user speech, the video information including a user face of a user, wherein the audio information and the video information correspond to a speaking process of the user;
    coding, by the electronic device, the audio information to obtain a mixed acoustic feature;
    extracting, by the electronic device, a visual semantic feature of the user from the video information, the visual semantic feature comprising a feature of a facial motion of the user in the speaking process;
    inputting, by the electronic device, the mixed acoustic feature and the visual semantic feature into a preset visual speech separation network to obtain an acoustic feature of the user, wherein obtaining the acoustic feature of the user comprises:
        performing regularization and one-dimensional convolutional layer processing on the mixed acoustic feature to obtain a deep mixed acoustic feature;
        upsampling the visual semantic feature to obtain a deep visual semantic feature that is time-synchronized with the deep mixed acoustic feature;
        connecting the deep mixed acoustic feature and the deep visual semantic feature in a channel dimension;
        performing dimension transformation to obtain a fused visual and auditory feature;
        predicting a mask value of the user speech based on the fused visual and auditory feature;
        performing mapping and output processing on the mask value to obtain a mask output; and
        performing a matrix dot product calculation on the mask output and the mixed acoustic feature to obtain the acoustic feature of the user; and
    decoding, by the electronic device, the acoustic feature of the user to obtain a speech signal of the user.

2. The method according to claim 1, wherein the audio information is mixed speech information comprising the user speech and an environmental noise; and
    wherein coding the audio information comprises:
        constructing a time-domain audio coder based on a convolutional neural network; and
        performing time-domain coding on the audio information by using the time-domain audio coder.

3. The method according to claim 2, wherein decoding the acoustic feature of the user to obtain the speech signal of the user comprises:
    constructing a time-domain audio decoder based on the convolutional neural network; and
    decoding the acoustic feature of the user by using the time-domain audio decoder to obtain a time-domain speech signal of the user.

4. The method according to claim 1, wherein the audio information is mixed speech information comprising the user speech and an environmental noise; and
    wherein coding the audio information comprises: performing time-domain coding on the audio information by using a preset short-time Fourier transform algorithm.

5. The method according to claim 4, wherein decoding the acoustic feature of the user to obtain the speech signal of the user comprises:
    decoding the acoustic feature of the user by using a preset inverse short-time Fourier transform algorithm to obtain a time-domain speech signal of the user.

6. The method according to claim 1, wherein extracting the visual semantic feature of the user from the video information comprises:
    converting the video information into image frames arranged in a frame play sequence;
    processing each of the image frames to obtain a plurality of face thumbnails that have a preset size and comprise the user face; and
    inputting the plurality of face thumbnails into a preset decoupling network to extract the visual semantic feature of the user.

7. The method according to claim 6, wherein processing each of the image frames to obtain the plurality of face thumbnails that have the preset size and comprise the user face comprises:
    locating a corresponding image area comprising the user face in each of the image frames; and
    zooming in or out the corresponding image area to obtain a corresponding face thumbnail of the plurality of face thumbnails that has the preset size and comprises the user face.

8. The method of claim 6, wherein the preset decoupling network includes a visual coder, a speech coder, a classifier, a binary classification discriminator, and an identity discriminator.

9. The method of claim 8, wherein the weight of the visual coder is frozen to train the identity discriminator, and the weight of the identity discriminator is frozen to train the visual coder.

10. The method of claim 6, wherein the preset decoupling network is trained using N video samples and N audio samples, where N is a positive integer greater than 1.

11. The method of claim 6, wherein training the preset decoupling network includes:
    obtaining an $m^{th}$ audio sample from a plurality of audio samples and an $n^{th}$ video samples from a plurality of video samples, wherein the $m^{th}$ audio sample does not match the $n^{th}$ video sample;

obtaining, from the m$^{th}$ audio sample, a speech representation including a sound feature;

obtaining, from the n$^{th}$ video sample, a visual representation including a facial identity feature and a visual semantic feature; and shortening a distance between the speech representation and the visual representation.

12. The method of claim 11, wherein shortening the distance comprises:
(a) performing a word-level audio-visual speech recognition task, and recording a loss;
(b) performing adversarial training by using a binary classification discriminator to recognize whether an input characterization is a visual characterization or an audio characterization; or
(c) minimizing the distance based on a loss.

13. The method according to claim 1, wherein performing the mapping and output processing on the mask value
uses a sigmoid function or
a Tanh function.

14. An electronic device, comprising:
at least one processor; and
a memory storing processor-executable instructions;
wherein the at least one processor is configured to execute the processor-executable instructions to facilitate the following being performed by the electronic device:
obtaining audio information and video information, the audio information including a user speech, the video information including a user face of a user, wherein the audio information and the video information correspond to a speaking process of the user;
coding the audio information to obtain a mixed acoustic feature;
extracting a visual semantic feature of the user from the video information, the visual semantic feature comprising a feature of a facial motion of the user in the speaking process;
inputting the mixed acoustic feature and the visual semantic feature into a preset visual speech separation network to obtain an acoustic feature of the user, wherein obtaining the acoustic feature of the user comprises:
performing regularization and one-dimensional convolutional layer processing on the mixed acoustic feature to obtain a deep mixed acoustic feature;
upsampling the visual semantic feature to obtain a deep visual semantic feature that is time-synchronized with the deep mixed acoustic feature;
connecting the deep mixed acoustic feature and the deep visual semantic feature in a channel dimension;
performing dimension transformation to obtain a fused visual and auditory feature;
predicting a mask value of the user speech based on the fused visual and auditory feature;
performing mapping and output processing on the mask value to obtain a mask output; and
performing a matrix dot product calculation on the mask output and the mixed acoustic feature to obtain the acoustic feature of the user; and
decoding the acoustic feature of the user to obtain a speech signal of the user.

15. The electronic device according to claim 14, wherein the audio information is mixed speech information comprising the user speech and an environmental noise; and
wherein coding the audio information comprises:
constructing a time-domain audio coder based on a convolutional neural network; and
performing time-domain coding on the audio information by using the time-domain audio coder.

16. The electronic device according to claim 15, wherein decoding the acoustic feature of the user to obtain the speech signal of the user comprises:
constructing a time-domain audio decoder based on the convolutional neural network; and
decoding the acoustic feature of the user by using the time-domain audio decoder to obtain a time-domain speech signal of the user.

17. The electronic device according to claim 14, wherein extracting the visual semantic feature of the user from the video information comprises:
converting the video information into image frames arranged in a frame play sequence;
processing each of the image frames to obtain a plurality of face thumbnails that have a preset size and comprise the user face; and
inputting the plurality of face thumbnails into a preset decoupling network to extract the visual semantic feature of the user.

18. The electronic device according to claim 17, wherein processing each of the image frames to obtain the plurality of face thumbnails that have the preset size and comprise the user face comprises:
locating a corresponding image area comprising the user face in each of the image frames; and
zooming in or out the corresponding image area to obtain a corresponding face thumbnail of the plurality of face thumbnails that has the preset size and comprises the user face.

19. The electronic device according to claim 17, wherein inputting the plurality of face thumbnails into the preset decoupling network to extract the visual semantic feature of the user comprises:
inputting the plurality of face thumbnails into the preset decoupling network;
mapping, by using the preset decoupling network, each of the face thumbnails to a corresponding visual representation comprising a facial identity feature and the visual semantic feature; and
separating the visual semantic feature from the corresponding visual representation for each of the face thumbnails.

20. A non-transitory computer-readable medium having instructions stored thereon, wherein the instructions, when executed, facilitate performance of the following:
obtaining audio information and video information, the audio information including a user speech, the video information including a user face of a user, wherein the audio information and the video information correspond to a speaking process of the user;
coding the audio information to obtain a mixed acoustic feature;
extracting a visual semantic feature of the user from the video information, the visual semantic feature comprising a feature of a facial motion of the user in the speaking process;
inputting the mixed acoustic feature and the visual semantic feature into a preset visual speech separation network to obtain an acoustic feature of the user, wherein obtaining the acoustic feature of the user comprises:
performing regularization and one-dimensional convolutional layer processing on the mixed acoustic feature to obtain a deep mixed acoustic feature;

upsampling the visual semantic feature to obtain a deep visual semantic feature that is time-synchronized with the deep mixed acoustic feature;
connecting the deep mixed acoustic feature and the deep visual semantic feature in a channel dimension;
performing dimension transformation to obtain a fused visual and auditory feature;
predicting a mask value of the user speech based on the fused visual and auditory feature;
performing mapping and output processing on the mask value to obtain a mask output; and
performing a matrix dot product calculation on the mask output and the mixed acoustic feature to obtain the acoustic feature of the user; and decoding the acoustic feature of the user to obtain a speech signal of the user.

* * * * *